C. E. BAUMER & J. CORREY.
SAFETY APPLIANCE FOR RAILWAY TRAINS.
APPLICATION FILED APR. 15, 1913.
1,131,594.
Patented Mar. 9, 1915.
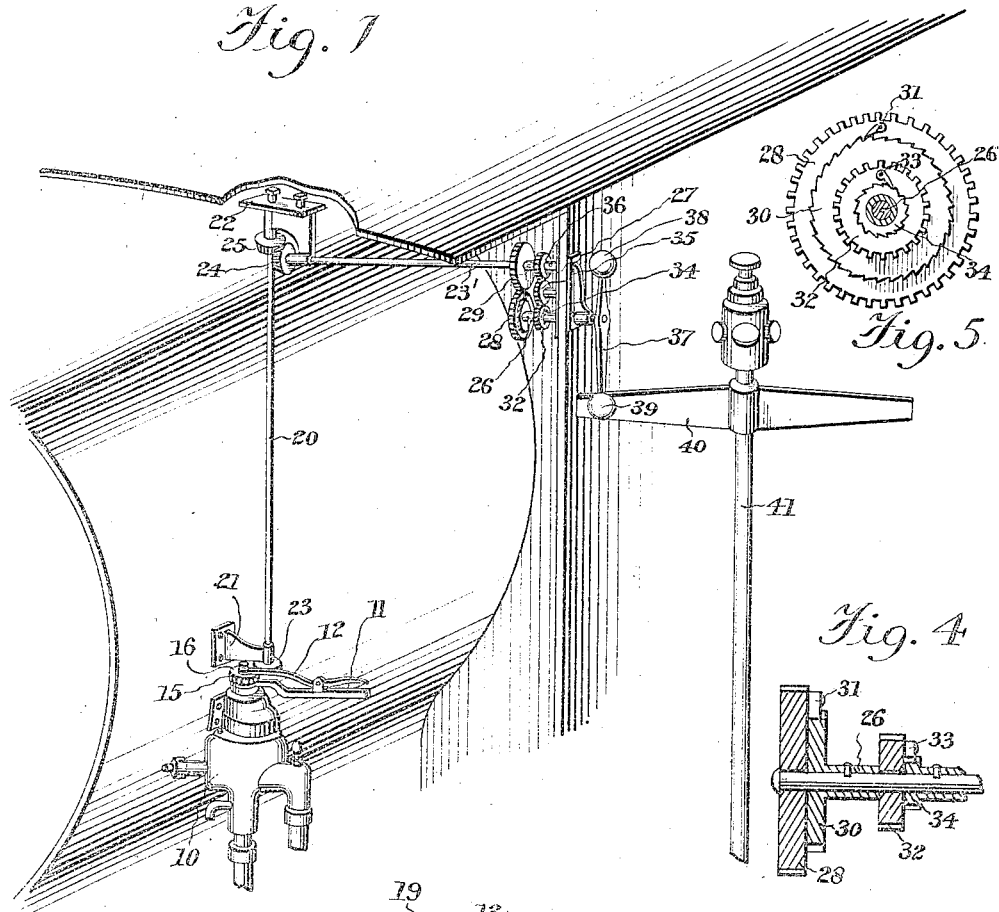
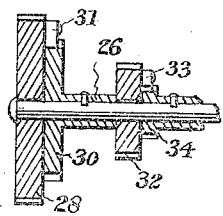
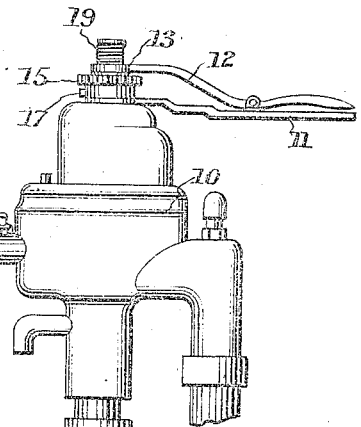
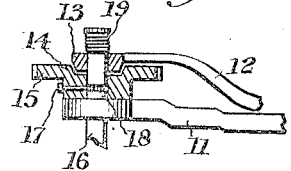
WITNESSES
INVENTORS
Clarence E. Baumer
and John Correy
Attorney

UNITED STATES PATENT OFFICE.

CLARENCE E. BAUMER AND JOHN CORREY, OF TROY, OHIO.

SAFETY APPLIANCE FOR RAILWAY-TRAINS.

1,131,594.  Specification of Letters Patent.  Patented Mar. 9, 1915.

Application filed April 15, 1913. Serial No. 761,279.

*To all whom it may concern:*

Be it known that we, CLARENCE E. BAUMER and JOHN CORREY, citizens of the United States, residing at Troy, in the county of Miami and State of Ohio, have invented certain new and useful Improvements in Safety Appliances for Railway-Trains, of which the following is a specification, reference being had therein to the accompanying drawing.

This invention relates to a device for automatically stopping a train in case the engineer runs by a set signal.

Another object of the invention is to provide a device which is so constructed that there is no danger of the operating mechanism returning to its original position after passing the signal, thus releasing the brakes and permitting the train to pass on without stopping.

Another object of the invention is to so construct the device that the safety mechanism will not be operated, unless the engineer passes the signal.

Another object of the invention is to so construct the device that the operating lever controlling the air brakes may be freely operated without interference by the automatic operating means.

With these and other objects in view this invention consists of certain novel combinations, constructions, and arrangements of parts as will be hereinafter fully described and claimed.

In the accompanying drawing: Figure 1 is a perspective view showing the device in place. Fig. 2 is an enlarged view of the air brake controller. Fig. 3 is a fragmentary sectional view of the upper portion of the device shown in Fig. 2. Fig. 4 is an enlarged longitudinal sectional view through one of the shafts of the automatic operating mechanism. Fig. 5 is a sectional view through the shaft shown in Fig. 4 and looking from the right toward the large gear wheel.

The controller 10 for the air brakes is of the usual construction and is provided with the operating lever 11 carrying a trip lever 12, the head 13 of which forms a friction clutch to fit into a socket 14 formed in the gear wheel 15. This gear wheel is loosely mounted upon the shaft 16 and is held in place by the pin 17 fitting into the groove 18. A spring 19 is coiled about the upper end portion of the shaft 16 and engages the head 13 to normally hold the same in the pocket 14, thus preventing the gear 15 from rotating without turning the lever 11 and shaft 16.

A shaft 20 is rotatably mounted in the bearings 21 and 22 and carries a gear wheel 23 which meshes with the gear wheel 15, thus causing the gear wheel 15 to be rotated when the shaft 20 is rotated. A horizontal shaft 23' is supported at one end by the bearings 22 and carries a beveled gear 24 which meshes with a beveled gear 25 mounted upon the shaft 20. A stub shaft 26 extends from the plate 27 which supports one end of the shaft 23' and carries a gear wheel 28 which is loosely mounted and meshes with a gear wheel 29 rigidly mounted upon the shaft 23. A ratchet wheel 30 is rigidly mounted upon the shaft 26 and is engaged by a pawl 31 so that when the shaft 26 is rotated in one direction the gear 28 will be rotated, and thus rotary motion transmitted through the gear wheel 29 to the shaft 23. A smaller gear wheel 32 is loosely mounted upon the shaft 26 and carries a pawl 33 extending in an opposite direction to the pawl 31 and engages the teeth of the ratchet wheel 34 rigidly mounted upon the shaft 26. This gear wheel 32 meshes with a gear wheel 35 which gear wheel 35 meshes with a gear wheel 36 mounted upon the shaft 23. It will, thus be seen that when the shaft 26 is turned in one direction the ratchet wheel 30 will cause the gear 28 to rotate, and through the gear wheel 39 turn the shaft 23' and that when the shaft 26 is rotated in the opposite direction the ratchet wheel 34 will cause the gear wheel 32 to rotate, thus rotating the gear wheels 35 and 36 to cause the shaft 23 to rotate in the same direction as it did when the shaft 26 rotated in the opposite direction. A lever 37 is mounted upon the outer end of the shaft 26 and carries counter-weights 38 and 39. This lever is mounted off-center so that it forms a pendulum adapted to be engaged by the arm 40 of the signal 41.

When the signal is set the arm 40 extends in the path of the pendulum and is extended to be struck by the weight 39 in case the engineer runs past the signal. When the weight strikes the arm, the shaft 26 is rotated and rotary motion is transmitted to the shafts 23 and 20. This will cause the gear 15 to be rotated, and since the friction clutch 13 is in tight engagement with the gear 15, the shaft 16 and lever 11 will be rotated to apply the air brakes. In order to release the air brakes the lever 11 must be grasped and the lever 12 rocked to bring the clutch head 13 out of engagement with the gear 15. This will permit the lever 37 to swing down to its normal position while the engineer is shutting off the air brakes. If the engineer sees the signal he can grasp the levers 11 and 12 and by pressing upon the lever 12 bring the clutch head out of engagement with the gear 15, thus permitting the shaft 16 to be turned without turning the shaft 20. By this construction it is not necessary to have a track instrument located at some point down the track before the station is reached, which track instrument would strike the operating lever before the train reached the station. This prevents the automatic device from setting the air brakes if the engineer has seen the signal and the train is thus prevented from being suddenly stopped when not necessary. As soon as the engine has stopped at the station the brakes are released, and after the station master has set the signal in the proper position the train can pass without the pendulum striking the arm 40.

Having thus described the invention what is claimed as new, is:—

In a safety device of the character described, the combination of a supporting plate a stub shaft, carried by and extending through said supporting plate, a gear wheel loosely mounted upon said shaft, a pawl carried by said gear wheel, a ratchet wheel positioned upon said shaft, said ratchet wheel provided with an integral sleeve fitting upon said shaft, said sleeve being fixedly secured to said shaft, said pawl engaging said ratchet wheel, a secondary gear wheel loosely mounted upon said shaft, said secondary gear wheel being held at a spaced distance from said first-mentioned gear wheel by means of said sleeve, a secondary ratchet wheel fixedly secured to said shaft adjacent said secondary gear wheel, a pawl carried by said secondary gear wheel and extending in the opposite direction to said first-mentioned pawl, cog wheels engaging the gear wheels whereby said cog wheels will rotate when said gear wheels are rotated, said cog wheels adapted to engage a valve-operating mechanism, an operating member fixedly secured to said shaft, said operating member adapted to strike a track obstacle whereby the same will be swung, said cogs adapted to operate said valve-operating mechanism irrespective of the direction in which the shaft rotates.

In testimony whereof we hereunto affix our signatures in presence of two witnesses.

CLARENCE E. BAUMER.
JOHN CORREY.

Witnesses:
G. A. BRANNAN,
C. F. FAUST.